United States Patent Office 3,182,551
Patented May 11, 1965

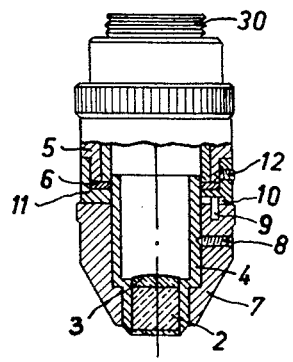
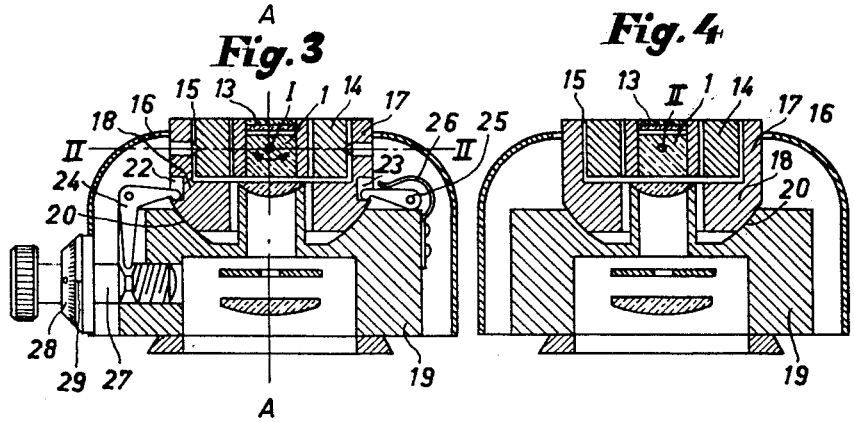
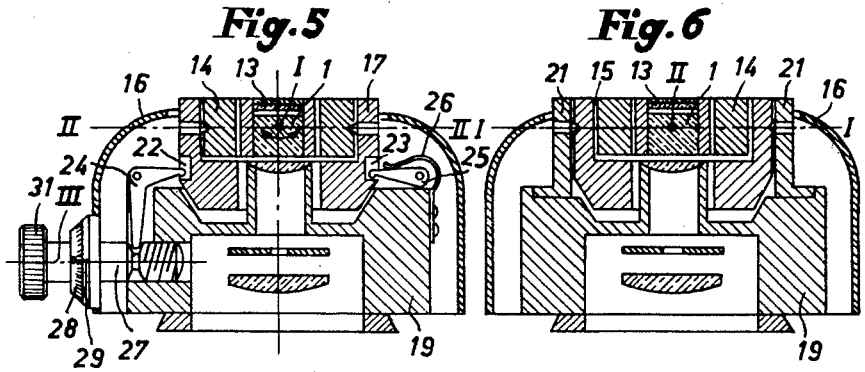

3,182,551
DEVICE FOR ADJUSTING BEAMSPLITTER OF INTERFERENCE MICROSCOPE
Horst Piller, Aalen, Wurttemberg, Germany, assignor to Carl Zeiss, Oberkochen, Wurttemberg, Germany
Filed Nov. 30, 1961, Ser. No. 155,939
Claims priority, application Germany, Nov. 30, 1960, Z 8,403
8 Claims. (Cl. 88—39)

The invention relates to an interference device for microscopes having a built-in beam splitter and beam recombining element.

Devices of this nature are generally based on a principle discovered by Lebedeff (Revue d'Optique 9, 1930) according to which a beam of light is split into two laterally displaced coherent components, whereby one component is conducted through the object and the other component through a comparison surface element disposed adjacent the object, both components being then reunited and brought to interference.

This known principle is illustrated in more detail in FIG. 1 of the drawings and may be explained as follows: Two plates $Q_1$ and $Q_2$ made of optically double refractive material and having equal thicknesses and optical orientation are arranged between two mutually transversely positioned polarizing elements $N_1$ and $N_2$ which respectively serve as polarizer and analyzer. The double refractive plates $Q_1$ and $Q_2$ are cut and orientated in such a manner that the lateral displacement of the extraordinary ray relative to the ordinary ray is as great as possible. As is well known, the ray of light following the normal rules of refraction in a double refractive crystal is called "ordinary ray" and the ray displaced therefrom is called "extraordinary ray." The ordinary ray, if striking a plane-parallel double refractive plate at right angles retains its original direction, whereas the extraordinary ray is laterally deflected. Both rays are linearly polarized perpendicularly with respect to each other. A $\lambda/2$ plate is interposed between the two double refractive plates $Q_1$ and $Q_2$ and a compensator K is positioned between the plate $Q_2$ and the analyzer $N_2$. The principal planes of vibration of the $\lambda/2$ plate are orientated in the same way as the planes of vibration of the polarizing elements $N_1$ and $N_2$ and are inclined at an angle of 45° to the principal sections of the plate $Q_1$ and $Q_2$. As is well known, a "principal section" is any plane containing the optical axis of the crystal, the later being defined as that direction in which the velocities of propagation of the ordinary and extraordinary rays are equal, that is the only direction in which no double refraction occurs. The object O to be examined is interposed in one of the parallel light beams between the $\lambda/2$ plate and one of the double refractive plates $Q_1$ or $Q_2$. The effect created by the $\lambda/2$ plate is as follows:

The position of the directions of vibrations is indicated in FIG. 1 by the arrows which are surrounded by circles. When these rays pass through the $\lambda/2$ plate, their planes of polarization are rotated about an angle of 90°. As a result, the ray which emerges from the plate $Q_1$ as ordinary ray becomes an extraordinary ray with respect to the plate $Q_2$ which has the same orientation as the plate $Q_1$, and the same applies conversely to the extraordinary ray so that the rays are then defracted in $Q_2$ in reversed relation as compared with $Q_1$ and are therefore re-united. Accordingly, the plate $Q_1$ operates as a beam splitter and the plate $Q_2$ as a beam recombining element. The beam emerging from the beam recombining element is generally elliptically polarized. In borderline cases the polarization may be linear or circular. The beam emerging from the beam recombining element is finally analyzed by means of the compensator K and the analyzer $N_2$. If an object is now interposed into one of the parallel light beams between the beam splitter $Q_1$ and the $\lambda/2$ plate, or between the $\lambda/2$ plate and the beam recombining element $Q_2$, a phase difference occurs in the beam passing through the object as compared with the other beam, and after reunion of the beams in the analyzer the beams will interfere.

If it is desired to measure the phase difference caused by an inserted object in a microscope, an essential requirement is an exact indexing of the relative positions of the beam splitter and beam recombining element. On the other hand, it is necessary that the microscope also permits a certain range of readjustment, for instance for adjusting any desired block-white or color contrast in the microscopic interference image or, in the course of the measurement of phase differences, for the purpose of adjusting the blackening or interference color of the image which will serve as indicator.

In the known interference microscopes, the beam splitter is mounted movably relative to the stationary beam recombining element. The beam splitter is generally rotatably and tiltably supported by a three-point support commonly used in mountings for condensers. Such three-point supports have the serious disadvantage that any rotative movement is always combined with a tilting movement and vice versa, so that the adjustment is quite undefined. Therefore, the alignment of the optical axes of the beam splitter and beam recombining element with respect to each other is rather tedious and complicated; such an alignment may for instance be carried out by means of a "conoscopic observation," i.e. an observation of the exit pupil of the objective lens with the aid of an auxiliary microscope.

It is an object of the present invention to simplify the adjustment of an interference device for microscopes having a built-in beam splitter and beam recombining element and to assure an increased reliability of the adjustment.

To this end, the adjustable beam splitter which is located in the condenser is tiltably mounted about predetermined angles about an axis normal to the principal section of the beam splitter. The adjustable beam recombining element which is located in the mount of the objective lens, is rotatable within predetermined limits about an axis perpendicular to said first mentioned axis. By virtue of this arrangement it is possible to divide the adjustment of the interference arrangement into two independent steps, which result in a clearly defined displacement of the optical axes of the beam splitter and the beam recombining element and which permit a rapid and accurate alignment of the same.

With these and other objects in view the invention will now be described in detail with reference to the accompanying drawings which illustrate a few examples of the invention.

In the drawing:

FIG. 2 illustrates an objective lens of a microscope having a built-in adjustable beam recombining element;

FIG. 3 illustrates a condenser cooperating with the objective lens shown in FIG. 2 and having a built-in adjustable beam splitter;

FIG. 4 illustrates the condenser shown in FIG. 3 but rotated about an angle of 90°;

FIG. 5 illustrates an alternative embodiment of a condenser in an interference device in a microscope and which is used in combination with the objective lens according to FIG. 2; and FIG. 6 shows the condenser according to FIG. 5 rotated about an angle of 90°.

Figure 1:
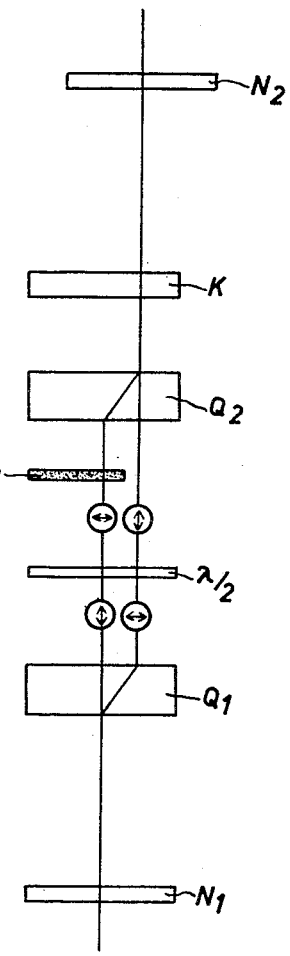
FIG. 1 illustrates the general principle of an interference device in a microscope.

Referring to the various embodiments of the invention, a beam splitter 1 and a beam recombining element 2, which are composed of plates of optically double refractive material, such as for instance calc-spar, are respectively mounted in the condenser and objective lens of a microscope so as to be adjustable independently from one another. The optical axis of the microscope is designated by the reference letter A.

As illustrated in FIG. 2, the beam recombining element 2 is mounted in a sleeve 4 which also holds the objective lens 3 and is azimuthally rotatable. The sleeve 4 engages a biasing ring 6 which is secured to the objective casing 5. The lower portion of the sleeve 4 is surrounded by another sleeve 7 which is connected with the sleeve 4 by a set screw 8. An abutment pin 9 is secured to the upper end face of the outer sleeve 7 and projects into an angularly extending guide slot 10 provided in a limit ring 11 which is rotatable about the casing 5. The limit ring 11 and thus the guide slot 10 may be locked to the casing 5 by a set screw 12.

Upon loosening of the set screw 12, a coarse adjustment of the beam recombining element 2 may be carried out by azimuthally rotating the sleeve 7, whereby the limit ring 11 is disengaged from the casing 5 and engageable by the abutment pin 9. If the set screw 12 is subsequently tightened, the limit ring 11 is secured to the casing 5 and a rotation of the sleeve 7, or of the sleeve 4 which is attached thereto, is only possible within the limits determined by the arcuate guide slot 10. In this way the azimuthal rotation of the beam recombining element 2 about the optical axis of the microscope is restricted to a few degrees, for instance 5 degrees.

Referring to FIGS. 3 to 6 inclusive the beam splitter 1 is positioned together with λ/2 plate 13 in a common bushing 14 which is disposed in a central bore 15 of a tiltable insert 17 mounted in a condenser housing 16. The bushing 14 is tiltable about the horizontal axis II—II and is lockable in its position within the bore 15. The insert 17 is either provided with a spherical end portion 18 slidably supported in a spherical socket 20 formed by the upper face of the condenser lens housing 19, as illustrated in FIGS. 3 and 4, or the insert is supported for oscillating movement in two vertical supports 21 mounted on top of the condenser lens housing 19, as illustrated in FIG. 6. As shown in the FIGS. 3 and 4, the insert 17 is dimensioned and positioned in such a way that its tilting axis I passes through the spherical center of the end portion 18. The insert 17 is provided with two oppositely arranged grooves 22 and 23 adapted to receive the free ends of levers 24, 25 which are positioned to transmit the tilting movement of the insert 17 about the axis I and to preclude rotative movement of the insert about the axis A. The latter applies particularly to the embodiment illustrated in the FIGS. 3 and 4. In the embodiment shown in the FIGS. 5 and 6, the position of the tilting axis I is determined by the supports 21. The lever 25 is subjected to the action of a pressure spring 26 attached with one end to the condenser lens housing 19. The axes of rotation of the levers 24 and 25 are arranged within the condenser lens housing 19. One arm of the angle lever 24 is engaged by a micrometer screw 27. Upon actuation of the micrometer screw 27 the other arm of the lever 24 which engages the groove 22 in said insert 17 acts upon the insert in such a way as to tilt the same about the axis I in one or the other rotational sense. The selected tilted position of the insert 17 is indicated on a dial plate 28 which is rigidly attached to the micrometer screw, calibrated in degrees of inclination of the insert 17 and adapted to cooperate with a stationary index 29.

The tilting axes I and II of the beam splitter 1 and the optical axis A are perpendicular with respect to each other and intersect in the optical center of the system formed by the beam splitter and the λ/2 plate, while the optical center of the beam recombining element 2 is positioned on the optical axis A above the optical center of the beam splitter 1.

The FIGS. 2 to 6 merely show the elements of the interference device which are essential for the invention. Other parts have been omitted, such as for instance a polarizer interposed between the source of light and the condenser of the microscope, and the analyzer elements disposed rearwardly of the beam recombining element. The parts as illustrated generally correspond to that portion of the ray path which in FIG. 1 is located between the beam splitter $Q_1$ and the beam recombining element $Q_2$.

The adjustment of the interference device described in the foregoing may be effected as follows:

(I) The basic adjustment for the purpose of obtaining absolutely equal phase differences in the beam splitter 1 and the beam recombining element 2 is made by the manufacturer in the course of the assembling. This adjustment includes:

(1) Azimuthal orientation of the principal sections of the beam splitter 1 and the beam recombining element 2 so that the same are (a) absolutely parallel to each other, and (b) are arranged in such a way that both make an angle of 45° with the direction of vibration of the polariser when the latter is in zero position.

The principal section of the beam splitter 1 is adjusted in a position parallel to the axis II and fixed in this position. The position of 45° inclined against the polariser is assured when the condenser fitting assumes its rest position in the condenser support. The orientation of the principal section of the beam recombining element 2 is effected by means of the rotatable sleeve 4 which is locked in position with the aid of the set screw 12 upon completion of the azimuthal adjustment. The objective lens is fixed in the threaded element 30 and always assumes the same rotational position when the objective lenses are interchanged.

(2) The crystal axes of the beam splitter 1 and the beam recombining element 2 are adjusted parallel to each other by alignment of the crystal axis of the beam splitter 1 relative to the axis of the recombining element 2 by tilting about the axes I and II. The position of tilt set in the said way is fixed by the makers.

(II) Re-adjustment of the equipment by the user during microscopy by means of the device according to the invention. Re-adjustment is required and desirable for the following reasons:

(1) For the purpose of setting any desired black-and-white or color contrast in the microscopical interference image. The most suitable contrast or color depends upon the object and upon the purpose of the examination.

(2) For the purpose of setting the blackening or the interference color of the image background which serve as indicators in the measurement of phase differences (the background is usually quite dark with the adjustment for zero phase difference).

(3) For the compensation of phase differences caused by undesirable effects such as uneven thickness in the preparation or tilting of the object and the like.

(4) For the purpose of compensating for relative rotations of the beam splitter 1 and the beam recombining element 2 about the microscope axis A such as occur even in the centering of condensers or objective with three-point mechanisms.

The measures listed under paragraphs 1–3 are easily carried out in the device according to the invention by means of tilting the beam splitter 1 about the axis I with the aid of a rotative movement of the knob 31 of the micrometer screw 27 about the axis III. Since the selected adjustment is indicated by the scale 28, the described tilting device may also be used as a compensator.

The adjustment specified under paragraph 4 and the further fine adjustment described in the paragraphs 1–3 are accomplished according to the invention by means of azimuthal rotation of the beam recombining element 2 together with the objective lens sleeve 4 with the aid of the second sleeve 7, the rotative movement of which is restricted to about 5°.

It will be apparent from the foregoing that a rapid and clearly defined fine adjustment is effected by means of limited rotation of the beam recombining element 2 about the optical axis A and subsequent tilting of the beam splitter 1 about the axis I.

What I claim is:

1. In an interference device for microscopes having a tubular objective housing, an objective lens and a polarizing beam recombining element mounted in said sleeve, a condenser housing in axially spaced relation from said objective housing to provide an object scanning area therebetween, a rockably mounted insert in said condenser housing, a bushing in said insert arranged in a pre-adjusted position, a beam splitter and a λ/2 plate mounted in said bushing, lever means on said condenser housing having one end portion engageable with said insert, yielding spring means arranged opposite said lever means for urging said rockable insert in a pre-selected direction, said rockable insert being tiltable about a predetermined angle about an axis which is perpendicular to the principal section of said beam splitter, manually operable means for controlling said lever means and for locking said insert in a pre-selected tilted position.

2. In an interference device for microscopes having a tubular objective housing and an objective lens, a polarizing beam recombining element mounted in said sleeve adjacent said objective lens, a condenser housing in axially spaced relation from said objective housing to provide an object scanning area therebetween, an insert rockably mounted in said condenser housing, a polarizing beam splitter mounted in said insert, said insert being tiltable about a pre-determined angle and about an axis which is perpendicular to the principal section of the beam splitter, whereby said tilting axis of said insert will pass through the center of the polarizing beam splitter, lever means pivotally mounted on said condenser housing having one end in driving engagement with said insert, manually operable means engageable with the other end of said lever means to rock said lever and tilt said insert about said axis, and manually operable means for rotating said beam recombining element a limited angular distance about an axis extending normal to said last named axis.

3. An interference device according to claim 2 in which said manually operable means for said insert comprises a micrometer screw engageable with the other end of said lever means which will automatically lock said insert in its preadjustment position.

4. An interference device according to claim 2 in which the tilting axis of said insert is disposed perpendicularly to the principal section of said beam splitter and intersects to optical axis of the microscope to extend at right angles thereto.

5. An interference device according to claim 2 in which said insert is provided with a spherical end portion which is mounted for universal movement in a spherical bearing formed in the upper face of said condenser lens housing.

6. In an interference device for microscopes having a tubular objective housing, a sleeve mounted in said housing for rotation therein, an objective lens and a polarizing beam recombining element mounted in said sleeve, a condenser housing having a condenser lens therein, an insert rockably mounted on said condenser housing, a bushing mounted in a central bore in said insert, a beam splitter and λ/2 angle plate mounted in said bushing, said bushing adapted to be tilted about an axis passing through the center of the system formed by said beam splitter and said λ/2 plate, said insert being provided with an indented spherical end portion which is universally supported in a spherical bearing recess formed in the upper face of said condenser lens housing, lever means pivoted on said condenser housing having one end in engagement with said insert, yielding lever means pivoted to said housing diametrically opposite said first lever means and engaging said insert, a manually operable screw shaft threadedly received in said condenser housing and having an annular groove for receiving the other end of said first named lever means whereby rotation of said shaft will adjust said insert about said last named axis and said spring lever means will exert a yielding force on said insert to retain the same in its pre-adjusted position, the tilting axis of said insert passing through the spherical center of said spherical end portion.

7. An interference device according to claim 1 in which said condenser housing is provided with a pair of diametral uprights on opposite sides of the lens bore of said housing and trunnion bearings mounted in said arms spaced from the upper ends thereof and engageable with said insert to provide a fixed tilting axis therefor, and a micrometer screw operably connected to said insert for adjusting the tilting movement thereof.

8. In an interference device for microscopes having a tubular objective housing and a condenser lens housing provided with a bore spaced from said objective housing to provide a scanning area therebetween, an objective lens and a polarizing beam recombining element mounted in a common sleeve in said tubular objective housing, a rockably mounted insert in said condenser housing, a bushing mounted in a central bore in said insert adjusted in a pre-selected position, a beam splitter and a λ/2 plate mounted in said bushing, the tilt axis of said rockably mounted insert passing through the center of the system formed by said beam splitter and said λ/2 plate, a pair of diametrally arranged supports on said condenser lens housing extending upwardly therefrom, trunnion support bearings in said supports received in bearing surfaces in said bushing to permit the insert to be tilted about a fixed axis coincident with said first named axis, lever means pivoted to said condenser lens housing on diametral sides thereof, spring means engageable with one of said lever means to urge said insert in a predetermined direction, a micrometer screw having a manually operable knob on one end and its other end threaded for being received in a correspondingly threaded opening in said condenser housing, said micrometer screw being provided with an annular groove for engaging the other of said lever means whereby manual adjustment of said knob will rock said insert about said trunnion bearing, and a second rotatable sleeve in said objective housing and a second sleeve in said objective housing for supporting said objective lens and recombining element and rotatably mounted in said first named sleeve for limited angular displacement of approximately 5 degrees.

References Cited by the Examiner

UNITED STATES PATENTS

| 2,777,360 | 1/57 | Blaisse | 88—14 X |
| 2,785,601 | 3/57 | Francon | 88—39 |
| 3,028,782 | 4/62 | Bernhardt et al. | 88—14 |

FOREIGN PATENTS

| 378,742 | 8/32 | Great Britain. |

JEWELL H. PEDERSEN, *Primary Examiner.*